US005214557A

United States Patent [19]

Hasegawa et al.

[11] Patent Number: 5,214,557

[45] Date of Patent: May 25, 1993

[54] D.C. VACUUM CIRCUIT BREAKER FOR AN ELECTRIC MOTOR VEHICLE

[75] Inventors: Mitsuyoshi Hasegawa; Takashi Tsuboi; Hiroyuki Akiyama; Tadashi Kamada; Taro Uchii, all of Katsuta, Japan

[73] Assignee: Hitachi, Ltd., Tokyo, Japan

[21] Appl. No.: 560,785

[22] Filed: Jul. 31, 1990

[30] Foreign Application Priority Data

Aug. 4, 1989 [JP] Japan ................................ 1-201178
Feb. 28, 1990 [JP] Japan ................................ 2-045418

[51] Int. Cl.[5] ........................................ H02H 3/033
[52] U.S. Cl. ........................................ 361/4; 361/9; 361/11
[58] Field of Search .................... 361/2, 10, 11, 13, 3, 361/4, 5, 6, 7, 8, 9, 12

[56] References Cited

U.S. PATENT DOCUMENTS 3,252,050 5/1966 Lee .
3,390,305 6/1968 Greenwood .
4,056,836 11/1977 Knauer ................................ 361/4
4,172,268 10/1979 Yanabu et al. ........................ 361/4
4,216,513 8/1980 Tokuyama et al. .................. 361/13
4,300,181 11/1981 Premerlani ............................ 361/4
4,305,107 12/1981 Murano et al. ........................ 361/4
4,458,119 7/1984 Hashimoto et al. ................ 200/145
4,740,858 4/1988 Yamaguchi et al. .................. 361/4
4,956,738 9/1990 DeFosse et al. ...................... 361/8

FOREIGN PATENT DOCUMENTS 0184566 6/1986 European Pat. Off. .
2331503 1/1975 Fed. Rep. of Germany .
2742965 4/1978 Fed. Rep. of Germany .
1436174 3/1966 France .
1504976 10/1967 France .

OTHER PUBLICATIONS

Brown Boveri Review, vol. 71, No. 12, Dec. 1984, pp. 567-566, Baden, C.H.; E. Ebnother; "Articulated Low-Floor Streetcar Class BE 4/6 of Geneva Public Transport", p. 570; Figure 7.

*Primary Examiner*—Todd E. DeBoer
*Attorney, Agent, or Firm*—Antonelli, Terry Stout & Kraus

[57] ABSTRACT

A vacuum circuit breaker particularly suitable for use in an electric motor vehicle. The circuit breaker includes a vacuum interrupter to which a voltage is applied, the series combination of a capacitor and a switch which are connected in parallel with the vacuum interrupter, a provision for charging the capacitor with a voltage opposite the voltage applied to the vacuum interrupter, and a resistance connected in parallel with the vacuum interrupter. The vacuum interrupter, the resistance, and the series combination of the capacitor and switch form oscillation circuit having an oscillation frequency at least 2 KHz and an inductance of at least 1 μH, with a commutating current of at least 5000 A for consuming energy stored in the circuit. In one embodiment, a capacitive element is connected in parallel with the resistor, and the length of the closed circuit include the vacuum interrupter and the capacitive element is shorter than the length of the closed circuit including the vacuum interrupter, the first capacitor, and the switch. Likewise, where no capacitive element is included, the length of the closed circuit including the vacuum interrupter and the resistance is shorter than the length of the closed circuit including the vacuum interruptor, the capacitor, and the switch. The resistance can be a linear or a nonlinear resistor, or the parallel combination of a linear resistor and a nonlinear resistor.

37 Claims, 15 Drawing Sheets

MAIN CIRCUIT CONFIGULATION

MAIN CIRCUIT
CONFIGULATION

D.C. VACUUM CIRCUIT BREAKER FOR AN ELECTRIC MOTOR VEHICLE

BACKGROUND OF THE INVENTION

1. Field of the Invention

This invention relates to a direct current circuit breaker which uses a vacuum current interrupter.

2. Description of the Prior Arts

Electric cars and electric locomotives (hereinafter referred to as electric rolling stock) have inherent in them a possibility that a failure may occur, such as a short circuit, due to a breakdown of an element (a thyristor, a GTO thyristor, or a transistor, for example) used in the main circuit of an inverter or a chopper, such as a ground fault caused by imperfect insulation of some wire in the main circuit, or such as an abnormal current increase resulting from a failure of the control system. If such a failure is left unattended, the equipment will burn. In order to prevent this accident, electric rolling stock have been conventionally equipped with a circuit breaker to cut off an excess current.

However, with the air circuit breaker heretofore used, for constructional reasons, the breaking speed is slow from when an accidental current flowed until the current is cut off, and before the circuit breaker opens itself, it sometimes happens that a circuit breaker in the ground substation of the feeder section where electric rolling stock is located opens the circuit. When the circuit breaker of the ground substation operates, all the electric cars within the feeder section supplied by that substation are unable to receive power, and thus they stop. In other words, the accident in one electric car stops to other electric cars. If such an accident occurs on a line with a congested train schedule, it is easily imaginable that the accident affects not only the electric rolling stock within the feeder section but also the electric rolling stock of other feeder sections.

This is because of the slow breaking speed of the air circuit breaker installed on the electric car, as mentioned above.

Consequently, there has been requirement for a DC vacuum circuit breaker with much higher breaking speed.

As described in JP-A-54-132776, to cut off a direct current is more difficult than to cut off an alternating current because a direct current does not cross a zero point. As a countermeasure, to facilitate cutoff of a direct current, current zero points are created artificially by providing a switching valve (hereafter referred to as a valve or interrupter with a commutating capacitor in parallel therewith and by forming an oscillation circuit (commutation circuit) in combination with the inductance of the circuit. The methods for this purpose are roughly divided into two groups: the reserve charging methods and the no-charging methods.

The reserve charging method is to charge a capacitor and discharge the electric charge stored in the capacitor when opening the interrupter. In this method, oscillation is produced by the capacitor and the inductance of the circuit. Since this oscillation circuit has a pure resistance component, the amplitude of the oscillation decreases exponentially. As the amplitude of oscillation at its early stage passes through a current zero point, the arc current in the interrupter is eliminated, thereby completing the cutoff.

In the no-charging method, on the other hand, a interrupter with negative arc characteristics is used, a capacitor is connected in parallel with this interrupter, and a divergent oscillating current is obtained when opening the interrupter. When the amplitude of oscillation in the diverging direction passes through a zero point, the current is cut off. This method, however, requires a certain length of time before the oscillation grows and passes through the current zero point.

Therefore, it is possible that before this occurs, the circuit breaker of the ground substation operates.

For this reason, a circuit breaker of the reserve charging method is more convenient when it is installed on the electric rolling stock.

A DC circuit breaker of the reserve charging method disclosed in JP-A-54-132776 is described below.

A capacitor is connected in parallel with the interrupter, and a resonance circuit is formed by this capacitor and stray inductance. By this arrangement, however, the current inclination, which is the time differential (di/dt) when the current flowing through the interrupter crosses the current zero point, is so great that it is difficult to cut off the current. As a solution to this, in order to reduce the current inclination, in addition to the stray inductance, an inductance of more than several millihenries (mH) is connected in series with the capacitor.

Let us consider the effect of varying the magnitude of the capacitor and the inductance of the above-mentioned prior art. If an inductance of several millihenries is used, the capacitor will be several thousand to tens of thousand microfarad ($\mu$F). Therefore, the capacitor will become very large in size.

The electric rolling stock have their equipment mounted under the floor and above the roof. The space for mounting the equipment is very limited, and if some apparatus is too large, it cannot be mounted on the electric rolling stock.

SUMMARY OF THE INVENTION

The object of this invention is to provide a DC vacuum circuit breaker of the reserve charging method which can be mounted on electric rolling stock.

In order to achieve the above object, a DC vacuum circuit breaker comprises:

a vacuum current interrupter for cutting off a direct current;

a series member including a capacitor and switching means and connected in parallel with the vacuum interrupter;

means for charging the capacitor;

an element connected in parallel with the vacuum interrupter, for consuming the energy stored in the stray inductance of the wire through which the direct current flows, wherein the oscillation frequency of the closed circuit including the vacuum interrupter, capacitor, and switching means is 2 kHz or more, the commutating current is 5000 A or more, and the commutating inductance included in the closed circuit is 1 $\mu$H or more.

The above-mentioned means permit the oscillation frequency of the communication circuit to be 2 kHz or more. Therefore, the stray inductance serves sufficiently as the commutating reactor, and a substantially smaller commutating capacitor can be used. Such a small element can be mounted in a limited space under the floor of the electric rolling stock.

DESCRIPTION OF THE PREFERRED EMBODIMENTS

Figure 1:
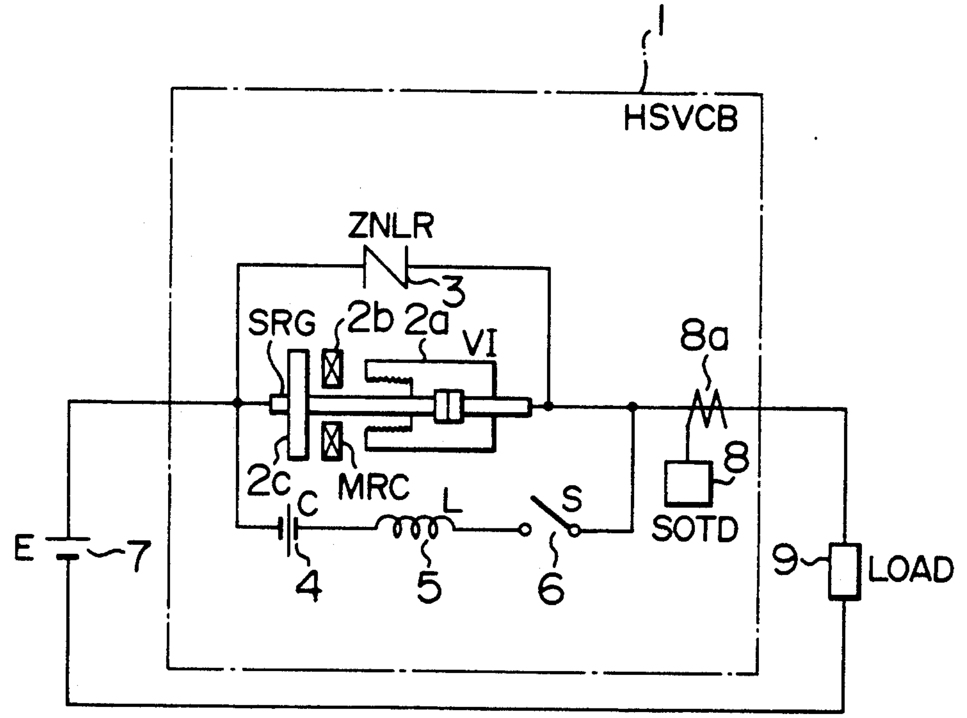
FIG. 1 is a diagram showing an embodiment of this invention.

According to JP-A-54-132776 mentioned above, in the reserve charging method, the current cannot be cut off securely at a frequency of 1 kHz or above of the oscillating current by a commutating capacitor and an inductance connected in parallel with the interrupter. The reason is that under the above-mentioned condition, the current inclination is so great.

The relation among the oscillating frequency, inductance and capacitor of the DC circuit breaker will be described briefly.

The breaking capacity of a circuit breaker (a measure of the capacity in terms of how large a main current can be cut off) depends on the magnitude of the commutating current flowing from the commutating capacitor, charged in reserve, in the opposite direction from the main current. In other words, to eliminate the arc produced in the interrupter, it is required that the peak value of the commutating current be larger than the main current. The commutating current i can be given by the following equation.

$$i = \frac{2V}{\sqrt{\frac{4L}{C} - R^2}} e^{-\alpha t} \sin \beta t \quad (1)$$

where $$\alpha = \frac{R}{2L}, \beta = \sqrt{\frac{1}{LC} - \left(\frac{R}{2L}\right)^2}$$

R: pure resistance component of the commutation circuit

L: inductance component of the commutation circuit

C: capacitance of the commutating capacitor

If the commutation circuit is formed of a wire with a sufficient cross-sectional area, the resistance component can be regarded as substantially zero. Therefore, the equation (1) will be:

$$i = \frac{V}{\sqrt{\frac{L}{C}}} \sin \sqrt{\frac{1}{LC}}\, t \quad (2)$$

From the equation (2), the peak value of the commutating current is $$I_p = \frac{V}{\sqrt{\frac{L}{C}}} \quad (3)$$

To increase the commutating current $I_p$, it is only necessary to increase the charged voltage V or the capacitance C of the commutating capacitor or decrease the inductance L.

The natural frequency $f_0$ of the commutation circuit is given by the following equation.

$$f_0 = \frac{1}{2\pi\sqrt{LC}} \quad (4)$$

Therefore, if the frequency $f_0$ and the maximum current $I_p$ are given, it follows that the inductance L and the commutating capacitance C are given by the following equations.

$$C = \frac{I_p}{2\pi f V} \quad (5)$$

$$C = \frac{V}{2\pi f I_p} \quad (6)$$

Therefore, as a way of decreasing the commutating capacitance C without changing the commutating capacity, a possible method is to increase the charged voltage of the commutating capacitor. This method, however, has a problem that the inductance L becomes large. The use of a charged voltage V of the capacitor, extremely higher than the circuit voltage, is not advisable from the viewpoint of design of insulating resistance because this increases the size of the circuit and elements used.

Figure 2:
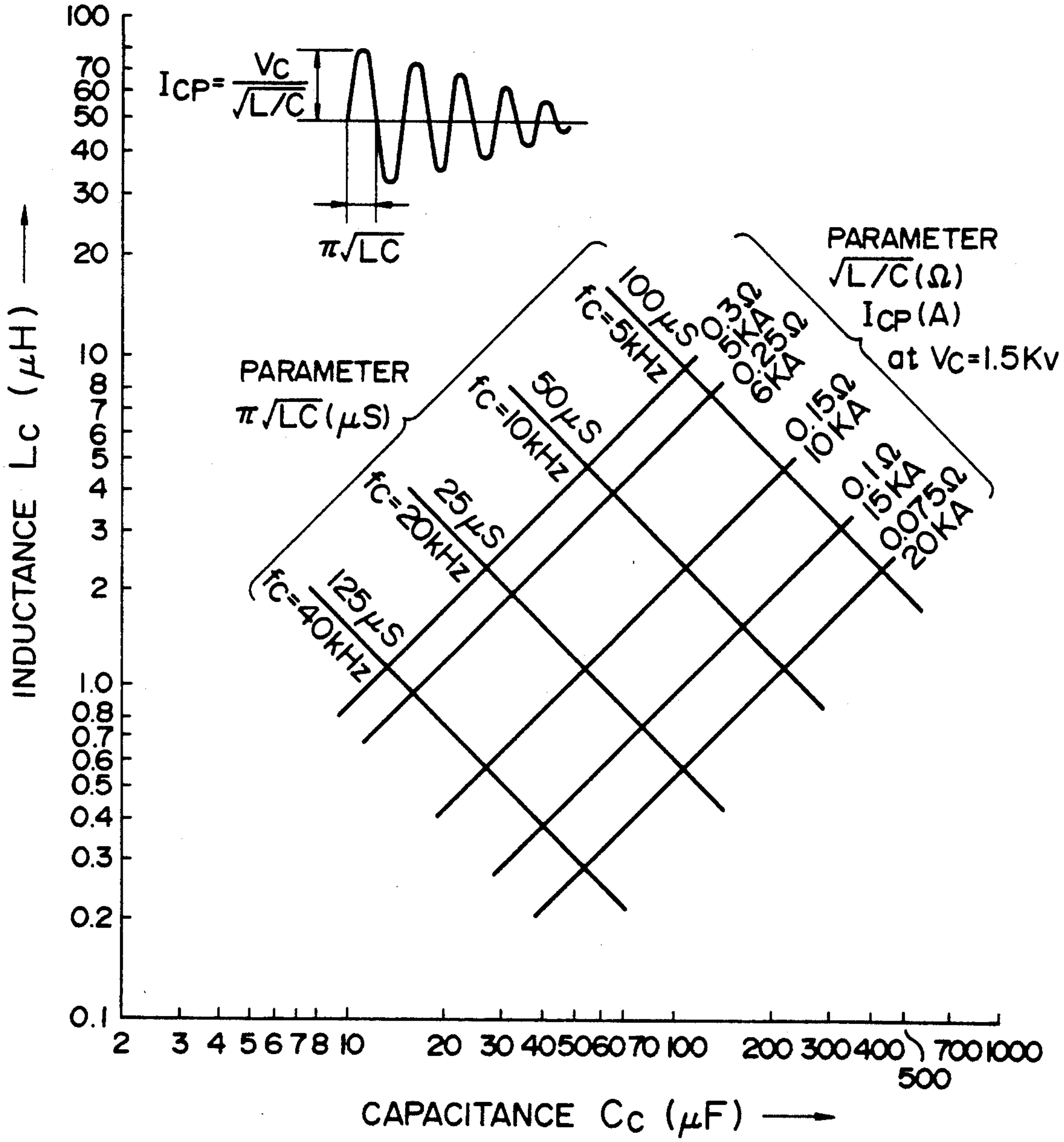
FIG. 2 is a diagram showing the relation among the commutating capacitance, commutating inductance, commutation frequency, and commutating current.

FIG. 2 shows the relation among the capacitance, the inductance L, and the peak value $I_p$ of the commutating current according to the equations shown above.

For instance, supposing a frequency of 1 kHz and a commutating current of 10 kA, the capacitance of the capacitor is 1000 μF and the inductance is 20 μH. The size of a capacitor with this capacitance is generally considered to approximately be 800 mm (width)×500 mm (depth)×500 mm (height). A capacitor of this size is too large to be mounted under the floor of electric rolling stock.

To decrease the commutating capacitance C and the commutating inductance L, it is obvious from FIG. 2 that you have only to increase the frequency $f_0$ of the commutation circuit.

However, in JP-A-54-132776 mentioned above, and also in "DC Circuit Breaker for Critical Plasma Test Equipment JT-60" of the Journal of the Institute of Electrical Engineers of Japan, 1978 June issue, Vol. 98, No. 6, page 44, it is stated that the limit of the frequency of the commutating current is about 1 kHz. The reason for this is that a large current decrease rate near the current zero point makes it difficult to break the current.

Under the present conditions, it is impossible to decrease the commutating capacitance C and the commutating inductance L.

The vacuum circuit breaker will now be described briefly.

If the interrupter or valve through which a current is flowing is opened in the air, the atoms existing between the electrodes are ionized. A flow of these atoms is an arc. On the other hand, since there is no atom between the electrodes in a vacuum, it follows that in principle, an arc is not formed when the valve is opened in, vacuum. A vacuum circuit breaker, operates on this principle, and this is the reason why a vacuum circuit breaker operates at high speed. However, it is very difficult to create a perfect state of vacuum. The fact is that when the valve is opened, an arc is produced by an arc voltage of several tens of volts, partly because metallic atoms of the electrodes melt opening the valve, allowing a current to continue to flow. To extinguish the arc, the commutation circuit is required.

To return to what we discussed before, if the commutation frequency is increased, both the capacitance and the inductance can be decreased. This is considered impossible to implement because there is a limit to the maximum value of the commutation frequency.

The inventors of this invention conducted an experiment which will be described in the following.

Figure 11A:
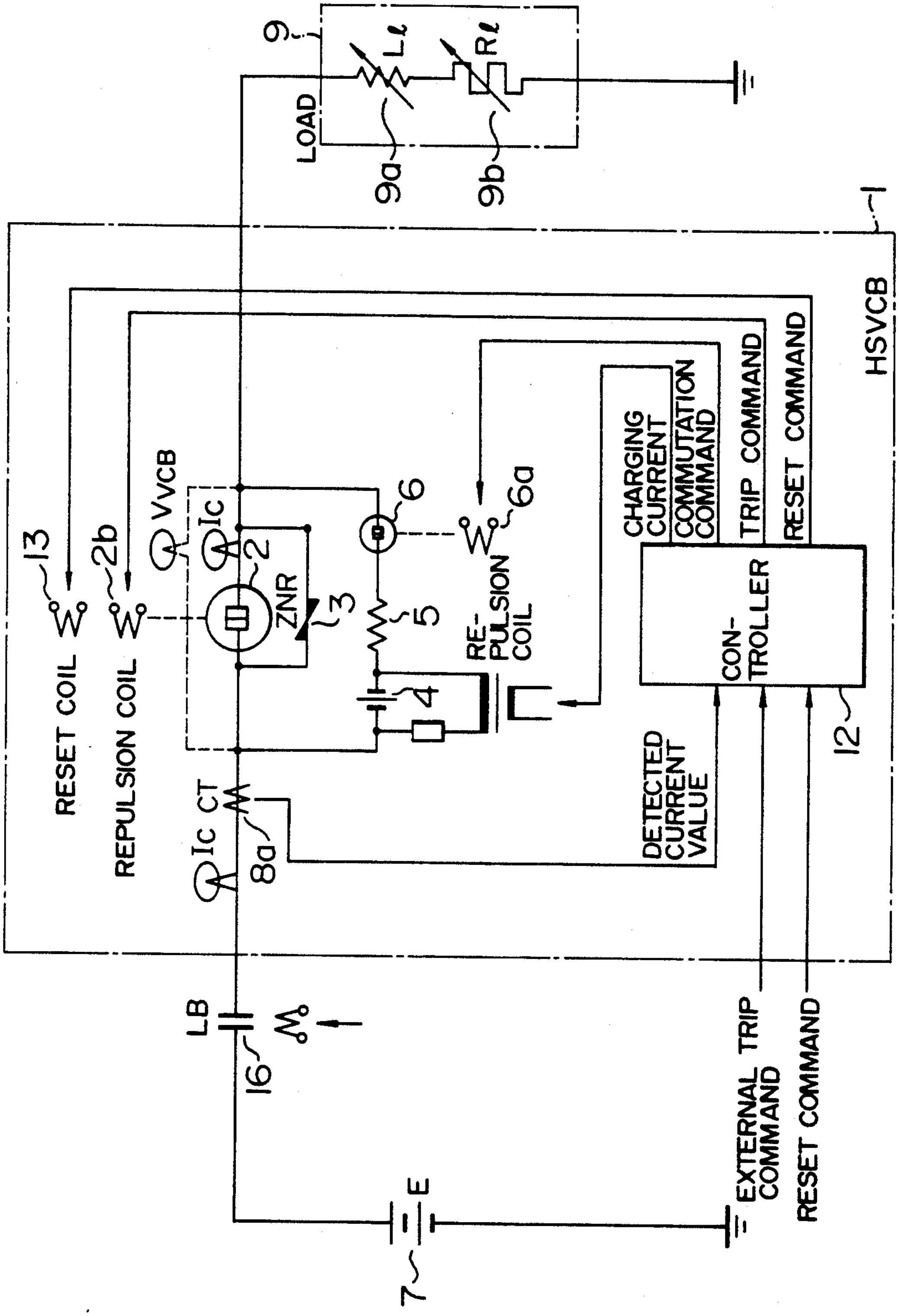
FIGS. 11A and 11B are diagrams showing an experimental equipment.

FIG. 11A shows a measuring circuit. A current from a DC power source 7 becomes an accidental current as it passes through variable loads 9*a*, 9*b*. Initially, a line breaker 16 is put in the OFF state and a vacuum valve 2 is put in the connected state. Main currents $I_L$, $I_C$ and a voltage $V_{VCB}$ are the chief items which are to be measured. The experimental procedure progresses as follows. The line breaker 16, which has been turned OFF, is turned ON to cause an accidental current to be produced. If the measured value of a overcurrent detector 8*a* exceeds a set value, the control section 12 issues a Trip command, so that a reaction coil 2*b* is excited, and the vacuum valve 2 is opened to cut off the current. Then, the line breaker 16 is turned OFF, and a Reset command is issued to cause the vacuum valve 2 to be closed, and a subsequent experiment is performed.

Since this experiment was conducted in the region where cutting off a current was said to be impossible, a Trip command was issued at times set inside the control section for the initial several sessions (Nos. 1 to 4 in the following table) without using the overcurrent detector 8*a*. Therefore, the set values to be described later are not shown.

Figure 11B:
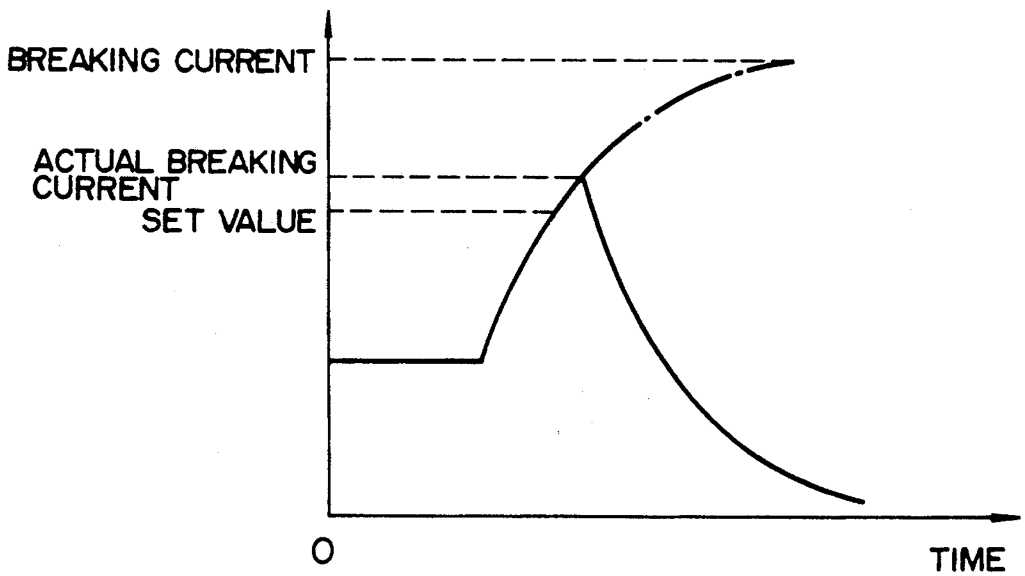

Referring to FIG. 11B, the terms will be explained.

The solid line in FIG. 11B indicates the current $I_L$, and the alternate long and short dash line indicates the current curve in a case where the accidental current was not cut off and instead was made to flow continuously. The set values are the operating current values, which are the values measured by the overcurrent detector 8*a* and at which the circuit breaker is operated. The actual breaking current is the operating point of the circuit breaker. The breaking current denotes the breaking capacity of the circuit breaker.

The following table shows the result of experiment in which the current was cut off successfully.

TABLE

| No. | Supply voltage E (V) | Breaking current (A) | Commutating current $I_p$ (A) | Commutating inductance (μH) | Commutating capacitor (μF) | Commutation frequency $f_0$ (KHz) |
|---|---|---|---|---|---|---|
| 1 | 1600 | 1600 | 8000 | 25 | 800 | 1.1 |
| 2 | | 1100 | 6000 | | 400 | 1.7 |
| 3 | | 1100 | 4000 | | 200 | 2.3 |
| 4 | | 1050 | 3000 | | 100 | 3.1 |
| 5 | | 1070 (800) | 1900 | | 50 | 4.0 |
| 6 | | 1050 (800) | 2800 | 12 | | 6.3 |
| 7 | | 2430 (1900) | 5000 | 4.1 (Stray) | | 11.1 |
| 8 | | 2500 (2080) | 5000 | | | 11.1 |

It has been shown in this table that the current can be cut off at a supply voltage of 1600 V, a set value of 2080 A, and a commutating current frequency of 11.1 kHz. The commutation frequency is about ten times greater than the value believed usable. By making the commutation frequency a high frequency, the commutating reactor can be done away with, and the only inductance component to be utilized is the stray inductance of the wires. Another advantage is that the commutating capacitor can be reduced to as small as 50 μF.

Stray inductance of about 1 μH remains even if the wiring is shortened to the shortest possible length. Therefore, the greatest possible commutation frequency is about 30 to 40 kHz. Incidentally, the value of the commutating capacitor in this case is about 30 μH.

With reference to FIG. 1, an embodiment of this invention will be described.

The main current from the DC power source 7 passes through the vacuum current interrupter or valve 2*a* and the static over current tripping device 8, 8*a*, and comes to the load 9. Connected between the poles of the vacuum valve 2*a* in parallel with the vacuum valve 2*a* is a series member including the commutating capacitor 4 and a commutating switch 6 as switching means of the valve. A zinc oxide nonlinear resistance 3 included in another loop, different from the circuit with the commutating capacitor 4, etc. is connected in parallel with the vacuum valve 2. The stray inductance of this closed circuit is smaller than that of a closed circuit including the commutating capacitor 4, etc. In other words, the closed circuit formed by the zinc oxide nonlinear resistance 3 and the vacuum valve 2a is shorter in wire length.

Though not shown in the figure, a circuit for charging is connected across the commutating capacitor 4.

When the static overcurrent tripping device 8 detects an abnormal current, the main repulsion coil 2b is excited to repel the short ring 2c away from the main repulsion coil 2b, so that the vacuum valve 2a is opened.

With reference to FIGS. 3A to 3E, the operating principle of this invention will be described.

Figure 3D:
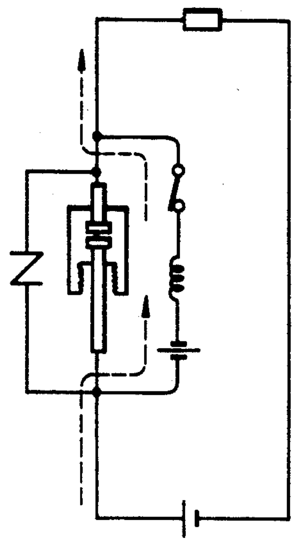
FIGS. 3A to 3E are diagrams showing the commutation principle of this invention.
Figure 3E:
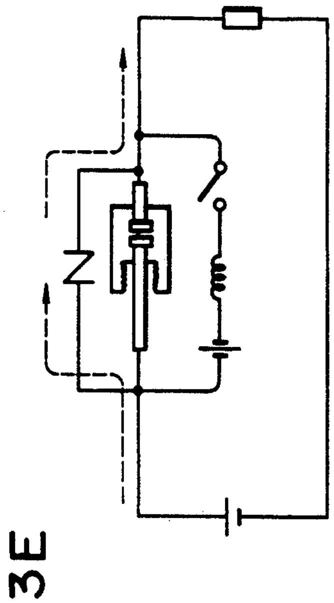
Figure 3A:
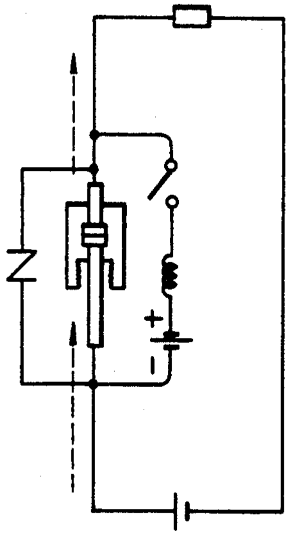
Figure 3B:
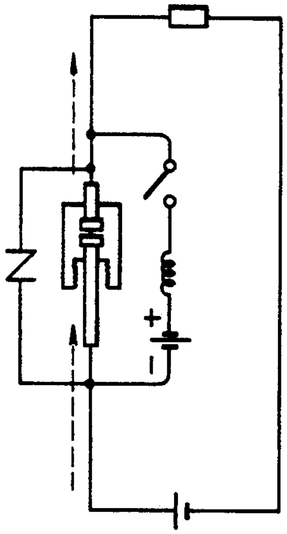
Figure 3C:
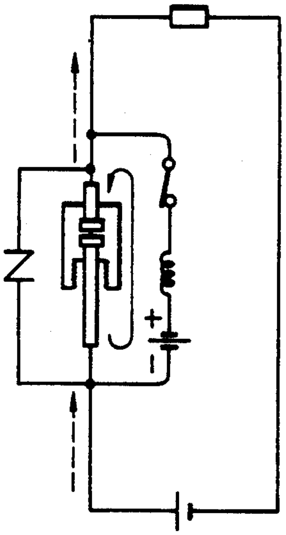

FIG. 3A shows how the main current flows through the closed vacuum valve 2a. The commutating capacitor 4 is charged in the direction as indicated in the figure. When an Open command is issued according to the condition of failure, the vaccum valve 2a is opened as shown in FIG. 3B. After the valve is opened, the main current continues to flow in the form of an arc in vacuum. Then, an ON command is given to the commutating switch 6, which is thereby closed as shown in FIG. 3C. At this moment, a closed circuit is formed which runs through the commutating capacitor 4 → stray inductance 5 → commutating switch 6 → vacuum valve 2a → and back to the commutating capacitor 4, the electric charge stored in the commutating capacitor C starts to flow as an oscillating current in the opposite direction from the main current. When the current in the vacuum valve 2a nears zero (several amperes) in due time, the arc is extinguished. However, the moment the arc goes out, the post-arc current of the current that has existed heretofore (the residue of the current that flowed as an arc through the vacuum valve 2a) disappears, and a peak voltage (dv/dt) emerges across the vacuum valve 2a, thereby causing an arc to be struck again. In this embodiment, the wire length for the zinc oxide nonlinear resistance 3 connected in parallel with the vacuum valve 2a is made shorter than the wire length of the commutation circuit, and therefore, the inductance on the side of the zinc oxide nonlinear resistance 3 is small. Consequently, in contrast to a case where the inductance is large in relation to the varying current, it is easier for the current to flow to the side where the zinc oxide nonlinear resistance 3 is.

The zinc oxide nonlinear resistance 3 has a capacitive component, and its magnitude is about 2000 times the capacitance of the vacuum valve 2a when the valve is opened.

With this in mind, the phenomenon of restrike prevention of the vacuum valve 2a will be described.

The moment the arc is extinguished, the post-arc current flows towards the capacitive component easiest to flow into. In this case, the post-arc current flows into the zinc oxide nonlinear reistance 3, so that a peak voltage is prevented from being applied to the vacuum valve 2a, and restrike of an arc can be prevented.

In the above embodiment, the zinc oxide non-linear resistance was dealt with as a typical element. However, in place of this resistance, any other element can be used so long as it is a energy-consuming element with constant-voltage characteristics and some capacitive component.

The peak value $I_p$ of the commutating current should preferably be more than 1.2 times the actual breaking current. The magnitude of the actual breaking current is determined by the output of the load, such as electric rolling stock, and the DC supply voltage. Given the electric rolling stock output of about 500 to 6000 kW and the DC supply voltage of about 600 to 3000 V, the $I_p$ of the commutating current should desirably be 5000 A or more.

Thus, the arc is extinguished completely, and the main current charges the commutating capacitor 4 as shown in FIG. 3D.

A constant voltage of the zinc oxide nonlinear resistance 3 is selected which is higher than the supply voltage E. When the voltage of the commutating capacitor 4 rises and the commutating switch 6 is opened as shown in FIG. 3E, the energy stored in the inductance of the main circuit is consumed. In this case, the zinc oxide nonlinear resistance 3 acts as a resistance.

Figure 5:
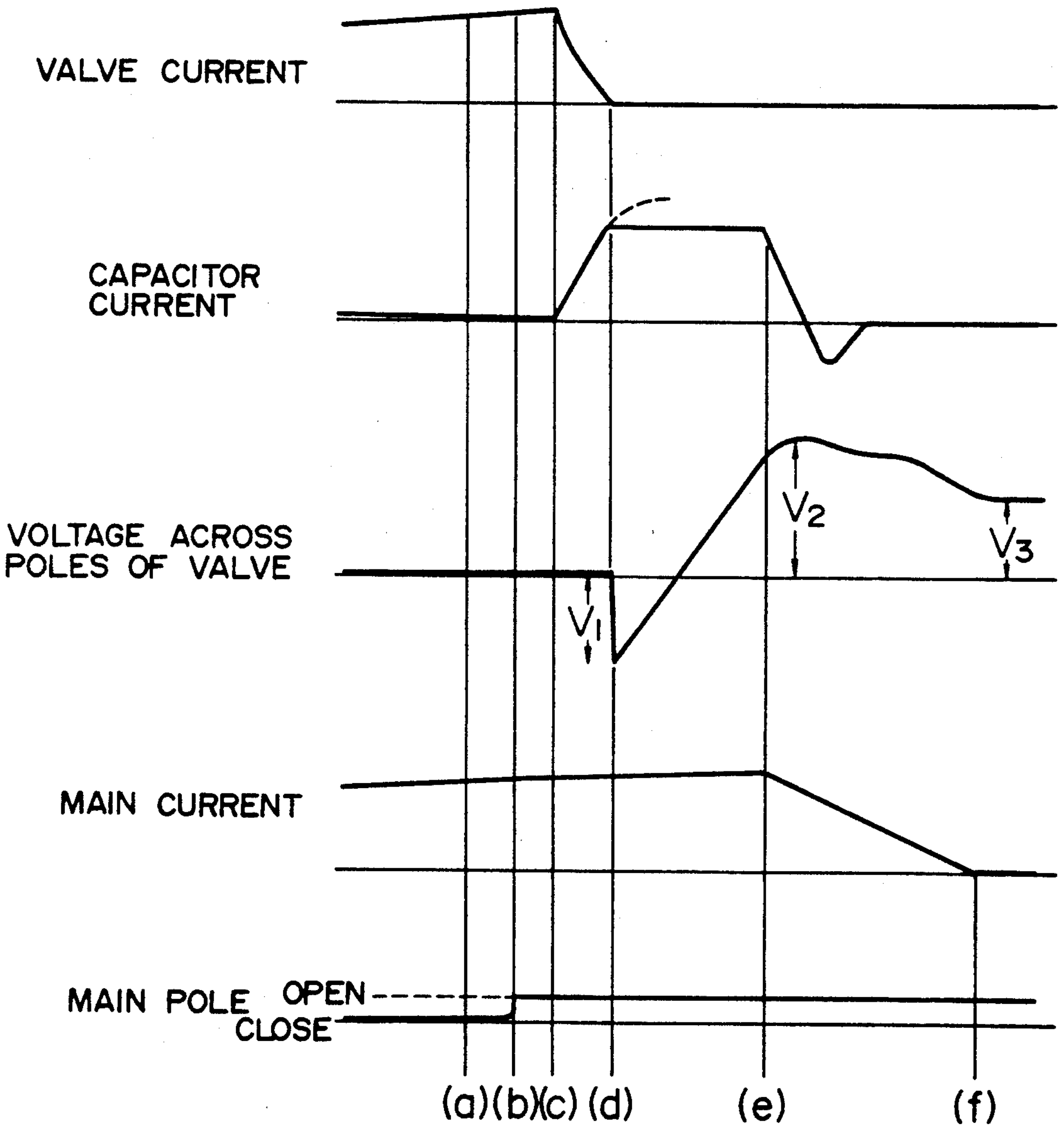
FIG. 5 is a diagram showing operation waveforms.

Referring to FIG. 5, the various waveforms when the circuit breaker trips will be described.

In FIG. 5, the axis of abscissa indicates the elapse of time.

Suppose that the main current increases due to an accident and exceeds the set value of overcurrent at point (a). The overcurrent is detected, an Open command is issued to the main pole, and the vacuum valve is opened at point (b). The main current continues to flow by arcing across the gap in vacuum. At point (c), the commutating switch 6 is closed, so that a commutating current starts to flow. Canceling each other with the commutating current, the current flowing through the vacuum valve 2a becomes zero in due time at point (d). The post-arc main current flows towards the zinc oxide nonlinear resistance 3, thereby preventing a rise of peak voltage across the poles of the vacuum valve 2a. After this, the current flowing to the commutating capacitor 4 increases, and in due time, the discharge starting voltage of the zinc oxide nonlinear resistance 3 is reached at point (e). The current flows to the zinc oxide nonlinear resistance 3, which consumes the energy stored in the inductance of the main circuit, so that the main current attenuates and a complete cutoff of the current is achieved at point (f).

Figure 4:
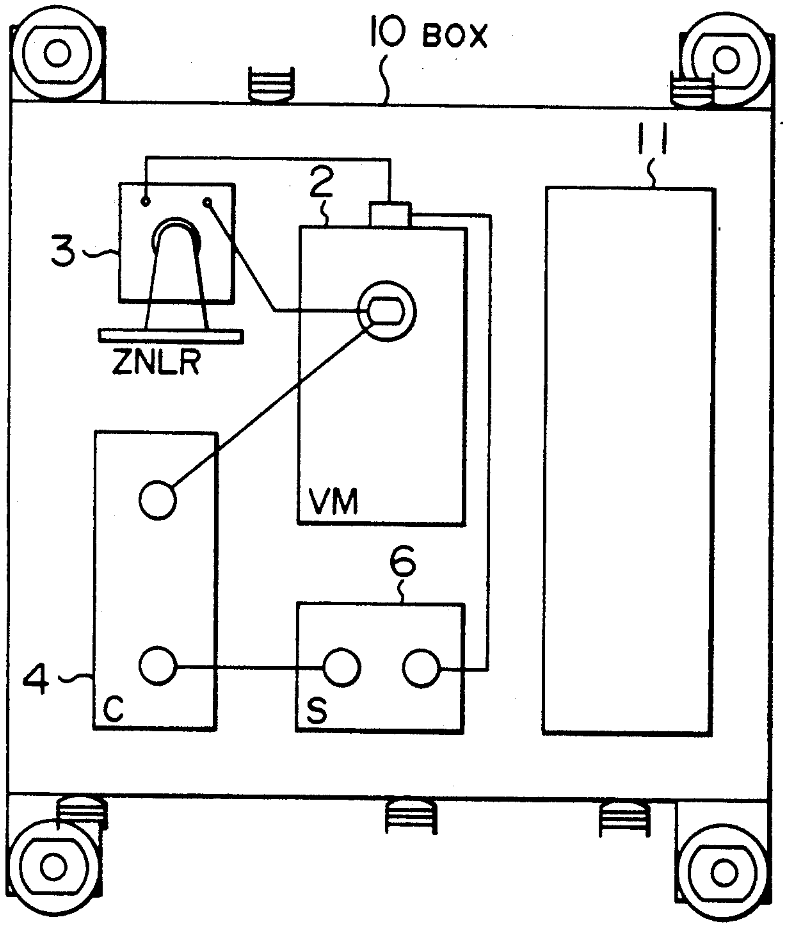
FIG. 4 is a diagram showing a DC high-speed vacuum circuit breaker according to this invention accommodated in a box.

With reference to FIG. 4, the arrangement of the circuit described above will be described. FIG. 4 is a diagram showing the layout of the interior of the box 10 mounted under the floor of electric rolling stock. The box 10 of the DC high-speed vacuum circuit breaker contains a vacuum valve 2a, an exciting coil 2b, a commutating capacitor 4, a commutating switch 6, a zinc oxide nonlinear resistance 3, and other elements. The wire length of the closed loop including the commutating capacitor 4 should be shortened insofar as feasible. As is clear from FIG. 4, this is difficult because the commutating capacitor 4 is so large. Therefore, the wire of the zinc oxide nonlinear reistance 3 has been shortened. Incidentally, the box 10 measures 500 mm (width)×600 mm (depth)×500 mm (height). The reason for the low height of 500 mm is that consideration was given to usability in electric rolling stock for underground railways.

The experimental results and the embodiments will be summarized. According to the two known examples mentioned above, it was believed that current could not be cut off at a commutating current frequency of 1 kHz or more. This was because the breaking current inclination (di/dt) was so great that an arc was bound to be struck. From the experiment by the inventors of this invention, however, it has been clarified that current can be cut off at frequencies of 1 kHz or above.

In compliance with the experimental result, no reactor is inserted in the commutation circuit in the above-mentioned embodiment. To be more specific, the inductance of the commutation circuit is only the stray inductance of the wire (the commutating reactor 5 is the stray inducatance). Supposing 5 μH for the inductance, the commutating capacitance 4 and the commutating current frequency are calculated. The commutating capacitance is expressed as:

$$C = \frac{I_p^2 L}{V^2} \quad (7)$$

Supposing that the charged voltage is 1500 V and the maximum commutating current $I_p$ is 6000 A, the capacitance is calculated.

$$C = 80(\mu F)$$

At this time, the commutation frequency f is:

$$f = \frac{1}{2\pi\sqrt{LC}} \quad (8)$$

where $f \approx 8$(kHz)

In addition to the elimination of the commutating reactor 5 by reducing the commutating capacitor 4, this embodiment offers an advantage that since the frequency is high, the next zero point comes very quickly even if a cutoff of the current failed at the first zero point for some reason.

Figure 6:
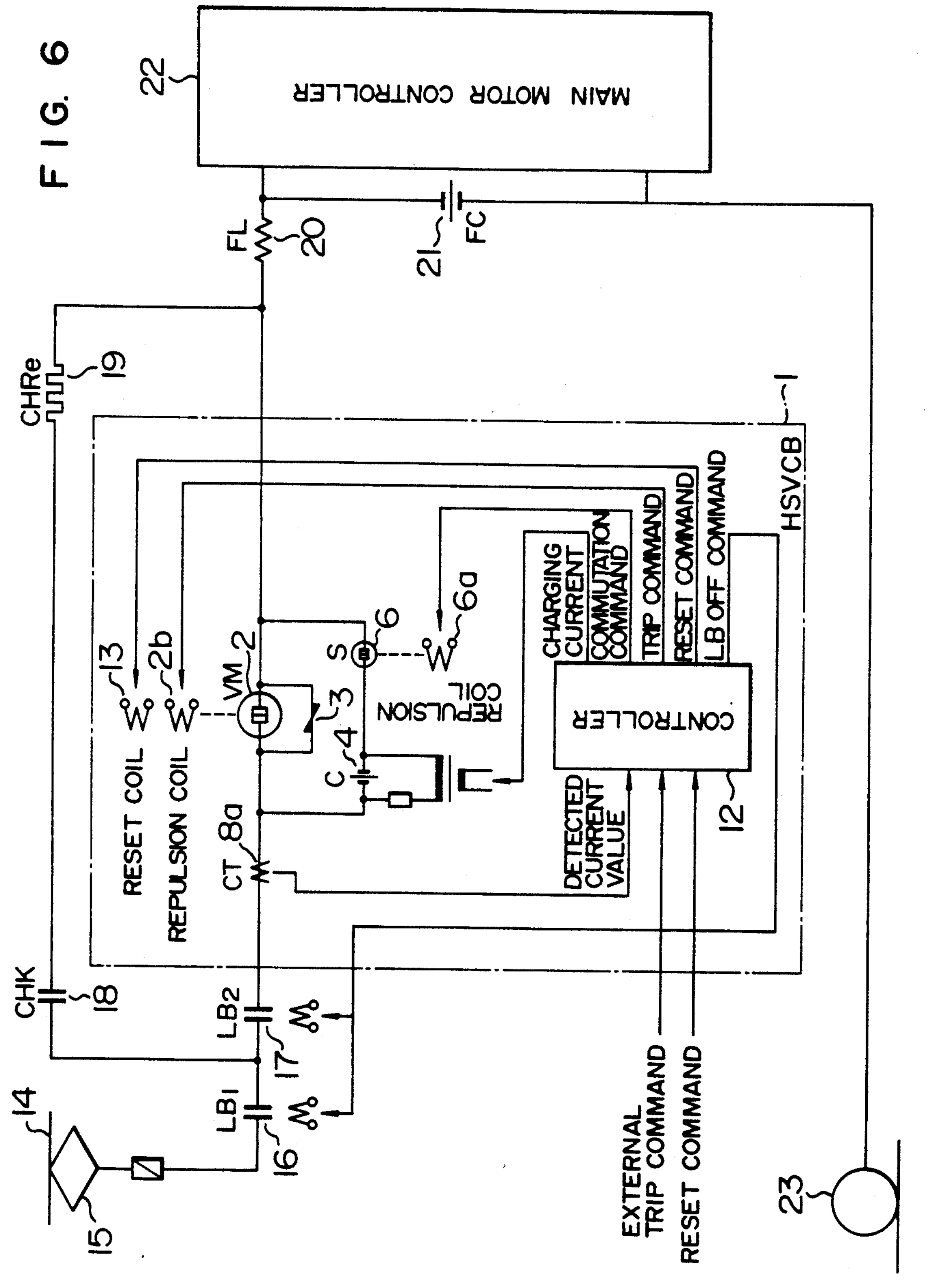
FIG. 6 is a diagram showing an application of the DC high-speed vacuum circuit breaker according to this invention to electric rolling stock.

With reference to FIG. 6, description will now be made of a case where a DC high-speed vacuum circuit breaker is used in electric rolling stock.

Normally, the DC high-speed vacuum circuit breaker 1 is in a closed state. Then, a paragraph 15 is raised to contact an electric overhead line, and line breakers 16, 18 are closed. A filter capacitor 21 with a large capacitance is charged through a charging resistance 19. After the capacitor has been charged, a line breaker 17 is closed, making the vacuum circuit breaker ready to be operated. When the engineer operates a master controller, not shown, a main motor controller puts a motor, not shown, into motion according to the manipulated variable.

When the engineer does a notchoff during power running, the main motor controller (particularly when an inverter is used) reduces the main current, and then, opens the line breakers 16, 17 to cut off the current. This is called current reducing rupture.

Description will then be made of operations when an accident occurs.

An accident is detected in two cases. The first case is when the overcurrent detector 8*a* detects the main current exceeding the set value. The second case is when a failure is detected in a device or the like in the main motor controller and an external Trip command is issued.

When any of these signals is input into the controller 12 in the DC high-speed vacuum circuit breaker 1 (hereafter referred to as the controller), the controller 12 sends a Trip command to the reaction coil 2*b*. By the reaction force, the vacuum valve 2*a* is opened, and the vacuum valve 2*a* is kept in that opened state by a locking mechanism. Then, about the time when the vacuum valve is opened to the position where the commutating current works effectively (operated by time sequence), the controller sends a Commutation command to the repulsion coil 6*a* to operate the commutating switch 6. As a result, the previously charged commutating capacitor 4 discharges the commutating current, so that a cutoff is completed as described above. When the cutoff is completed, the main current is zero, with the result that the controller sends an LB Off command, by which the line breakers 16, 17 are opened.

When the vacuum circuit breaker is recovered from the accident, the engineer presses the reset push-button on the engineer's stand, whereby the resetting operation is started.

When a Reset command is input into the controller, the controller 12, sends a Reset command to a resetting coil 13, so that the locking mechanism is released, and then the vacuum valve 2*a* is closed. Then, a charging current is supplied to charge the commutating capacitor 4 to a predetermined value, and the DC high-speed circuit breaker 1 is placed in the standby state.

According to this embodiment, it is possible to provide the electric rolling stock with a high-performance DC high-speed vacuum circuit breaker reduced in size particularly for mounting in electric rolling stock, and by this means, it is possible to cut off an accidental current earlier than the circuit breaker at the ground substation. This precludes series effects that the accident would otherwise have on many other electric cars.

Figure 7:
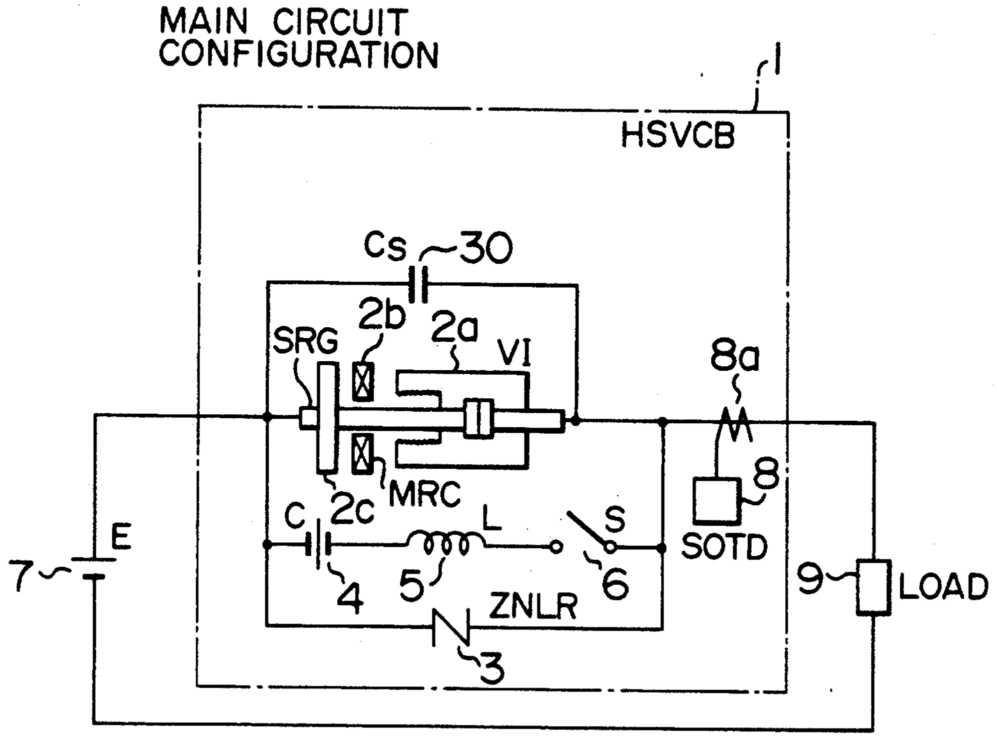
FIGS. 7 to 10 are diagrams showing other embodiments of this invention.

With reference to FIG. 7, another embodiment of this invention will be described.

Referring to FIG. 7, the differences from the circuit configuration of FIG. 1 are that the zinc oxide nonlinear resistance 3 is connected in parallel side by side with the commutation circuit (including the commutating capacitor 4 and the commutating switch 6), and that a surge-absorbing capacitor 30 is connected in parallel close by the vacuum valve 2*a* so that the wire length of the latter branch is shorter than the closed loop of the commutation circuit.

In this circuit, as the commutating current flows into the vacuum valve 2*a* and the arc is extinguished, the greater part of the post-arc current flows to the surge-absorbing capacitor 30, thus suppressing the voltage rise rate, so that re-ignition of the arc is prevented.

It is necessary to select a larger capacitance for the capacitor 30 than the capacitance of the vacuum valve which is opened. The important thing is never to select too large a capacitance. This is because a capacitor with large capacitance is too large in size to be mounted on the electric rolling stock.

The effect of this embodiment is that the capacitance of the surge-absorbing capacitor 30 can be selected according to the purpose of use. For instance, if the zinc oxide nonlinear resistance 3 is large, the stray inductance cannot be sufficiently small. In this case, it is only necessary to select a small surge-absorbing capacitor 30.

Figure 8:
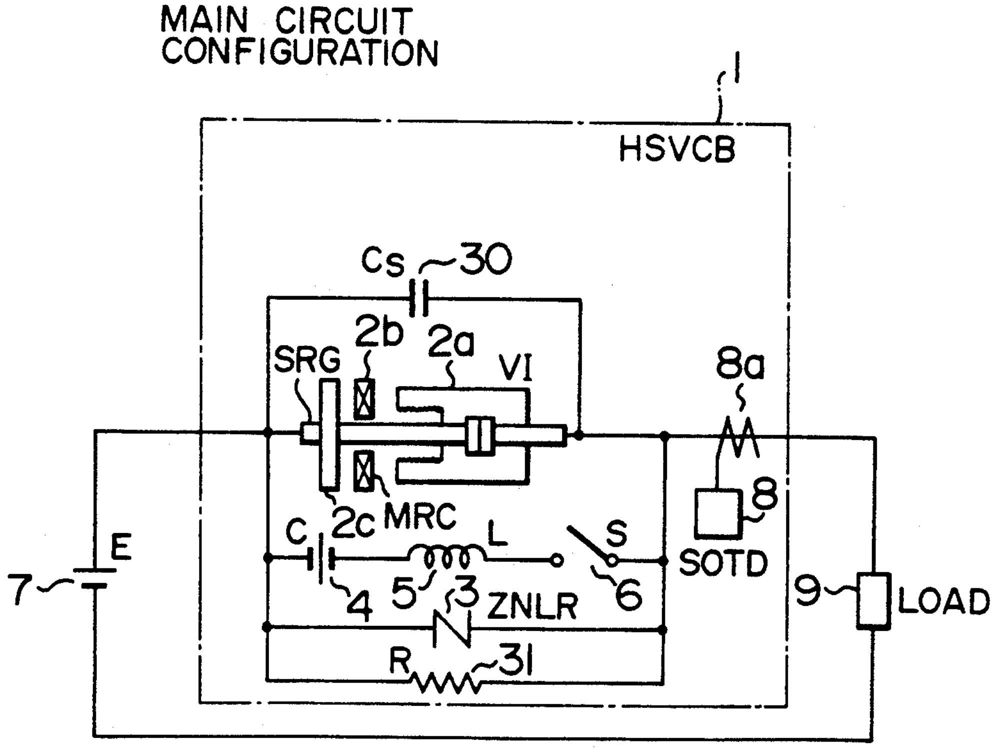

Referring to FIG. 8, still another embodiment will be described.

The only difference from the circuit configuration of FIG. 7 is that a resistance 31 is connected in parallel with the zinc oxide nonlinear resistance 3.

When the vacuum valve 2*a* is opened and the zinc oxide nonlinear resistance 3 is put into operation, if the energy stored in the stray inductance 5 from the DC power source 7 is large, the resistance 31 participates in the consumption of the energy. This reduces the burden on the zinc oxide nonlinear resistance 3. In this case, however, the main current does not disappear completely, but continues to flow from the DC power source 7 to resistance 31 to the load 9 in that order, so that it will be necessary to provide a switch to cut off a low current.

Figure 9:
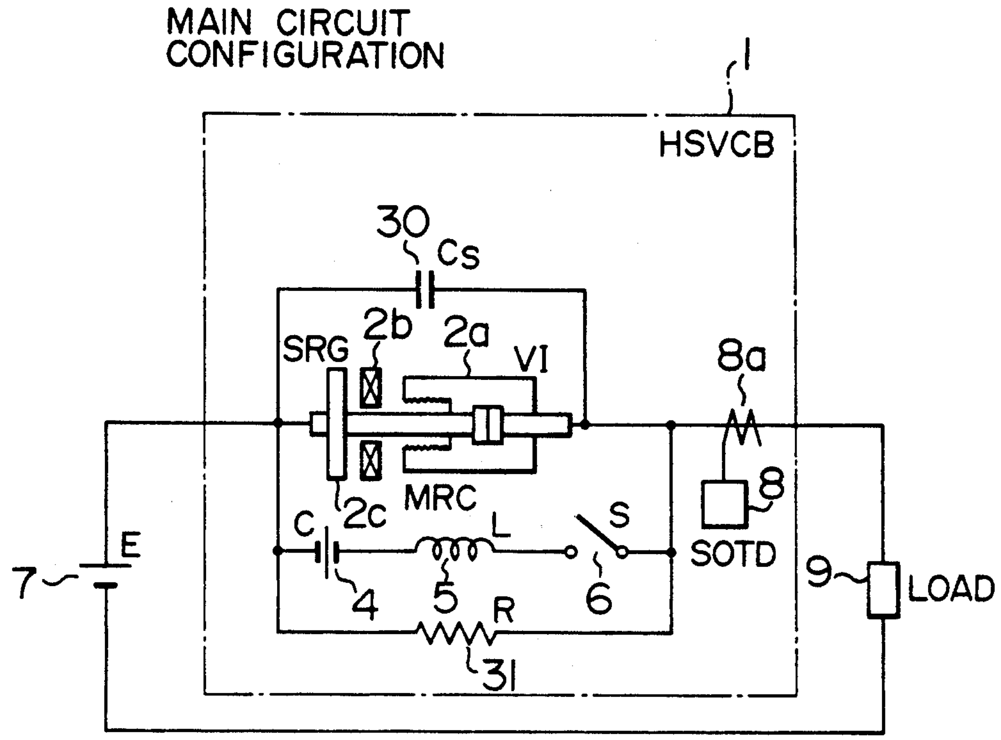

Referring to FIG. 9, a further embodiment will be described. The difference from the circuit configuration of FIG. 8 is that the zinc oxide non-linear resistance 3 has been done away with. Only the resistance 31 consumes the energy stored in the stray resistance. The reistance 31 does not have constant-voltage characteristics like the zinc oxide nonlinear resistance 3 does, so that the current keeps flowing. Also in this case, it will be necessary to provide another breaker.

According to this embodiment, the circuit configuration is simple and the price is less expensive. Therefore, this embodiment is suitable for cutting off a relatively small current.

Figure 10:
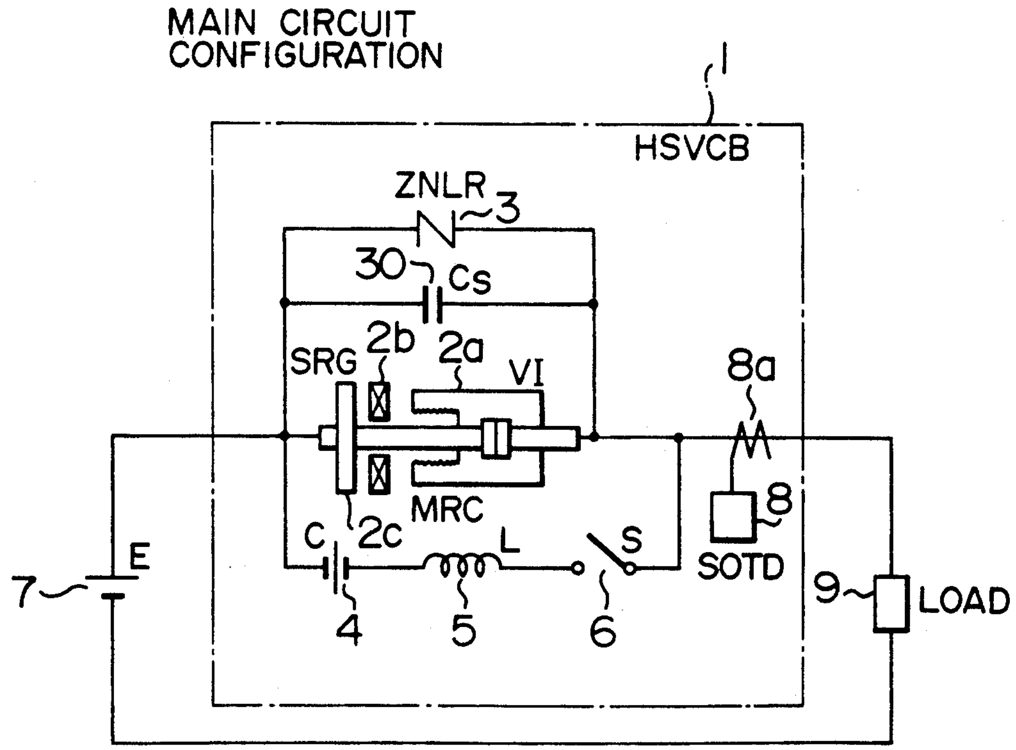

With reference to FIG. 10, yet another embodiment will be described.

The difference from the circuit configuration of FIG. 7 is that the zinc oxide nonlinear resistance 3 is connected in parallel with the surge-absorbing capacitor 30.

This embodiment is effective in a case where the zinc oxide nonlinear reistance 3 is not enough to meet the required magnitude of capacitance, leaving a possibility that an arc is struck again.

With reference to FIGS. 5, 12, 13, 14, and 15, another embodiment will be described.

In FIG. 5, point (c) indicates the time at which the commutating switch is closed, point (d) indicates the time at which the voltage of the vacuum valve becomes zero, point (e) indicates the time at which the zinc oxide nonlinear resistance starts discharging, and point (f) indicates the time at which the main current attenuates completely. $V_1$ indicates the voltage applied across the vacuum valve just after the vacuum valve recovers its dielectric strength (substantially equal to the commutating capacitor voltage at this time). $V_2$ indicates the discharge starting voltage of the zinc oxide nonlinear resistance, and $V_3$ indicates the supply voltage.

In the vacuum valve, the arc diffuses very quickly, and the moment the current attenuates to zero, the dielectric strength recovers, so that the current is cut off. However, if the valve current change rate (di/dt) is too large, when the current becomes zero, it sometimes happens that an arc is struck again and the current flows again in the reverse direction (cutoff failure). The reason is considered as follows. In principle, the moment the current in the vacuum valve attenuates to zero, the dielectric strength of the valve should recover, and from this moment onwards the valve current should be held at zero. However, the fact is that while the interpole voltage of the valve is zero, the main circuit current, on which the oscillating current is superimposed, flows.

Incidentally, in order to reduce the size of the equipment so as to permit it to be mounted on the electric rolling stock, it is necessary to reduce the values of the commutating capacitor and the commutating reactor as mentioned above, decrease other constants, and raise the frequency of the oscillating current with fixed peak values. In consequence, the current change rate becomes large at the time when the vacuum valve current attenuates to zero, thus offering a possibility that an arc is struck again.

A prior-art example of a solution to this problem is disclosed in JP-A-59-163722 which suggests that a resistance be connected in series with the commutating capacitor. In this technique, however, part of the commutating energy is consumed by the resistance, the peak value of the commutating current decreases, and the maximum breaking current becomes small.

Figure 12:
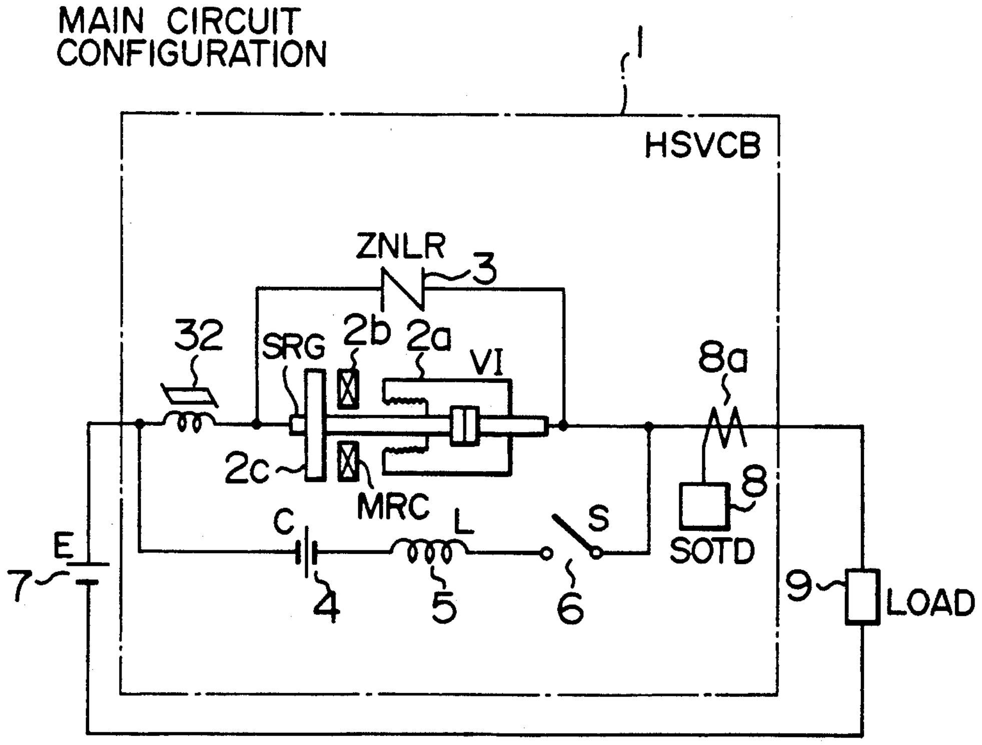
FIG. 12 is a diagram showing another embodiment of this invention.

A solution according to the present embodiment is to insert a saturable reactor 32 in series with the vacuum valve 2a the closed commutating circuit, as shown in FIG. 12.

Figure 13:
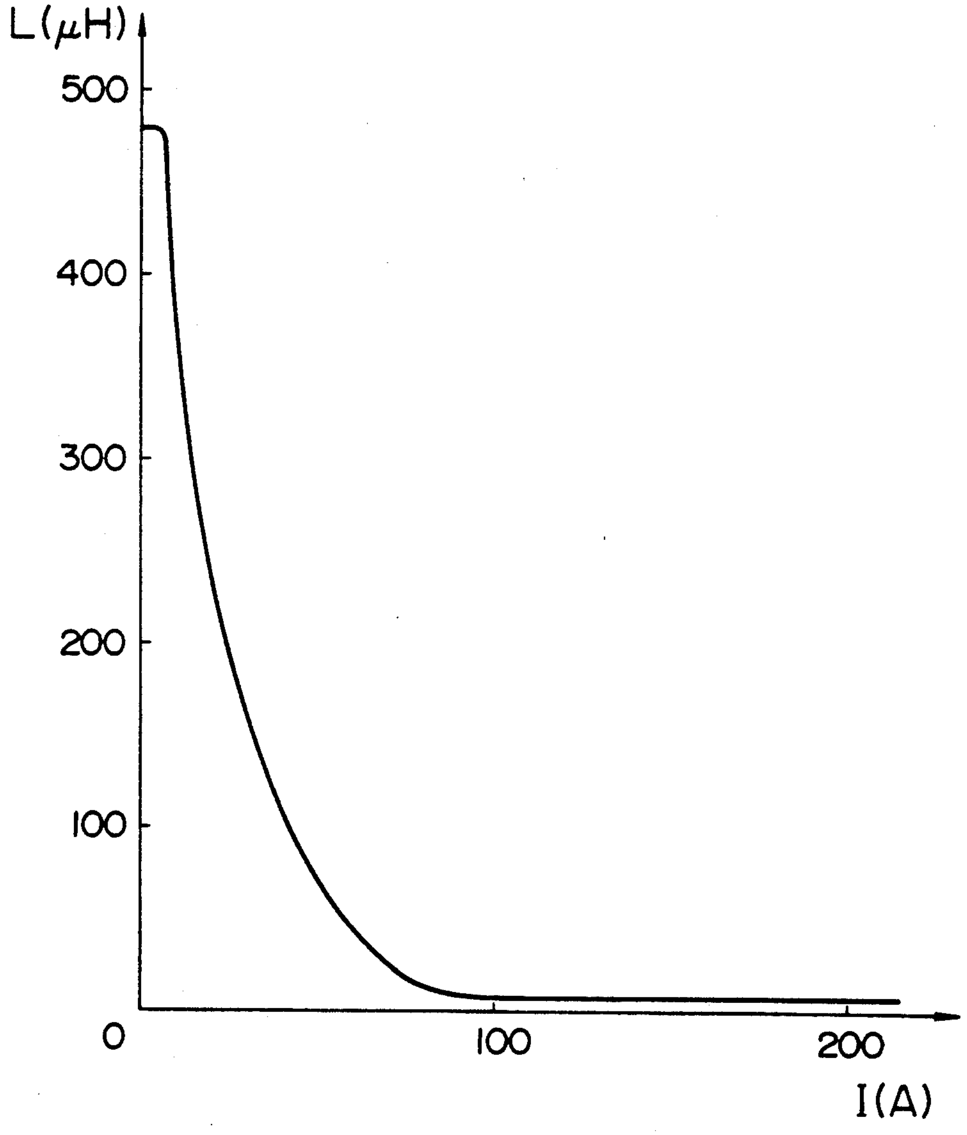
FIG. 13 is a diagram showing the characteristics of a saturable reactor.

The saturable reactor 32 has a characteristic shown in FIG. 13 that ideally, its inductance is very large when the current flowing through the valve is small and as the current increases beyond a certain value, the inductance decreases rapidly.

Figure 14:
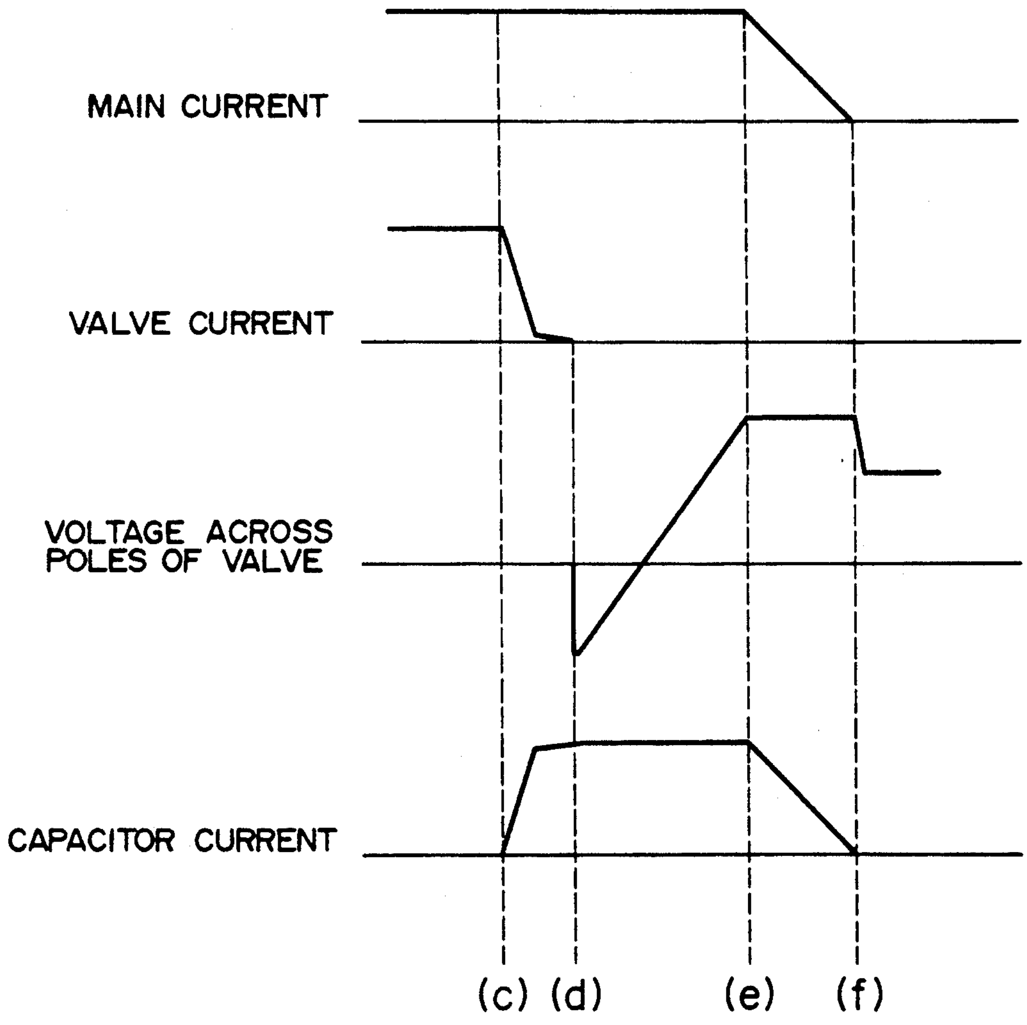
FIG. 14 is a diagram showing the effect of the embodiment of FIG. 12.

FIG. 14 shows the waveforms when the current is cut off in this embodiment. Generally speaking, the waveforms are almost the same as before, but it is obvious from FIG. 14 that the current change rate decreases notably at time (d), or just before the current zero point of the vacuum valve.

This is a phenomenon that occurs because the current is prevented from changing as the inductance increases rapidly when the current decreases as it comes close to the zero point.

According to this embodiment, without changing the constant values of the resonance circuit, by increasing the frequency of the oscillating current and securing high peak values of the current, it is possible to decrease the current change rate near current zero points and ensure a recovery of the dielectric strength of the vacuum valve.

Figure 15:
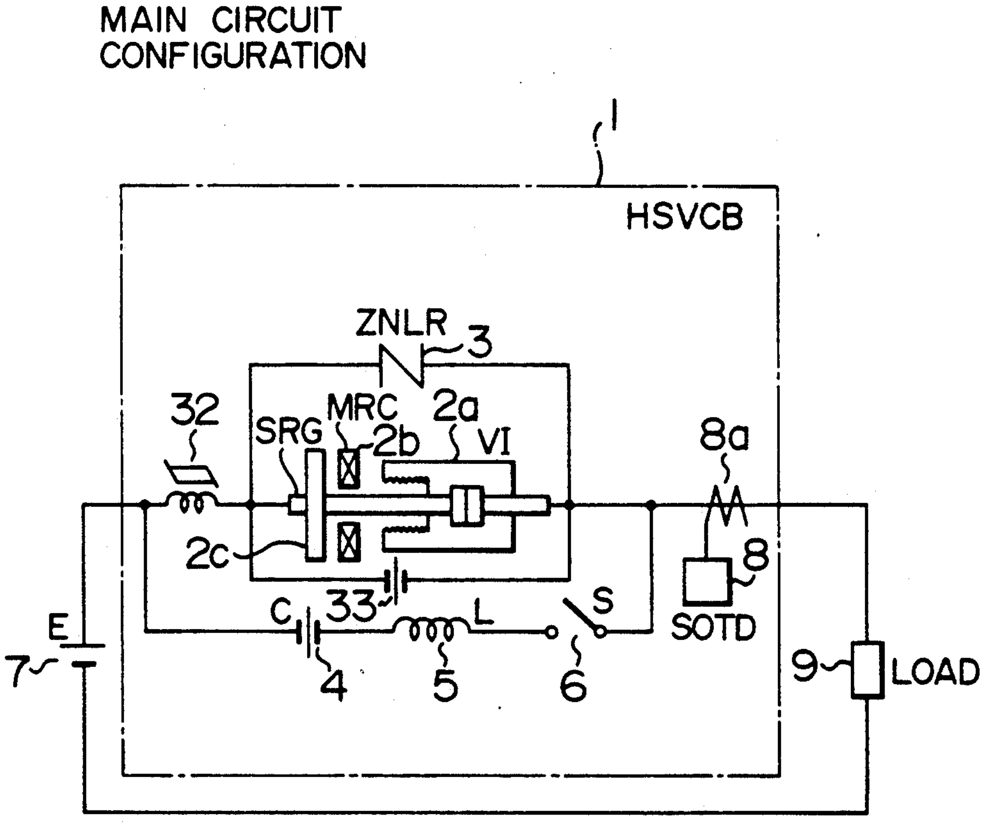
FIG. 15 is a diagram showing a modification of the embodiment of FIG. 12.

With reference to FIG. 15, an additional embodiment will be described.

In the preceding embodiment, the saturable reactor 32 was inserted to reduce the current change rate in the vicinity of a current zero point of the vacuum valve 2a. Besides the current change rate, another factor which impedes the recovery of the dielectric strength of the vacuum valve is the voltage change rate in the process of recovery of the dielectric strength. A high voltage change rate induces dielectric breakdown in the process of recovery of the dielectric strength so that an arc is struck again and the current flows again.

In order to prevent this phenomenon, by connecting capacitor 33 between the poles of the vacuum valve 2a and in parallel with the vacuum valve 2a, a sharp change in the voltage can be suppressed.

According to this embodiment, it is possible to reduce the possibility of restrike of the switching circuit using a vacuum valve.

Description will be made of how the vacuum circuit breaker described above is mounted in electric rolling stock.

As described in Japanese Utility Model Application Laid-open No. 61-65640, the conventional line breaker is so constructed as to be mounted on the electric rolling stock with the whole line breaker box insulated by double insulators.

Description will be made briefly using FIG. 16.

The main circuit current flows through the overhead wire 14 and current collector 15 into the line breaker box 41. Arranged in series in the line breaker box 41 are the line breakers 16, 17, and a high-speed circuit breaker 40. The main circuit current that has passed through the line breaker box 41 flows through a filter reactor 20 to the control equipment box 42. (Those parts are mounted to the car body 50 with fixtures 45.) The main motor 43 is driven by a control current from the control equipment box 42. Then, the current flows through the car body 50 and wheels 23 to rails 24 and returns to the substation, not shown.

Incidentally, the line breakers 16, 17 and the high-speed circuit breaker 40 (different from the above-mentioned DC high-speed circuit breaker 1) are all air circuit breakers, and therefore, an arc is struck when the current is cut off. When the arc is caught on the line breaker box 41, because this box is insulated by the insulators 44 from the car body, a ground fault does not occur. Nor is the circuit breaker at the substation tripped.

Under the above arrangement, if a DC high-speed vacuum circuit breaker 1 shown in FIG. 6 is used to replace the high-speed circuit breaker 40, the following problem will result.

The DC high-speed vacuum circuit breaker 1 does not emits an arc to the outside. However, the line breakers 16, 17, which are air circuit breakers, give off an arc and the arc flies to the parts at low potential.

Meanwhile, in a DC high-speed vacuum circuit breaker 1 shown in FIG. 6, there is provided a controller 12 to send various commands. This controller 12 is connected through a terminal, not shown, to a main motor controller (to a gate controller in the case of inverter electric rolling stock and chopper electric rolling stock, or a notch step advance controller and an engineer's stand in the case of camshaft rolling stock).

For the control power source connected to the above terminal, 100 VDC, 24 VDC or 15 VDC, for lower than the main circuit voltage, is used. When the current is cut off by opening the line breakers 16, 17, part of the arc produced flows into the line breaker box 41, and flies to a moving contact spring, terminals, and a fixed contact carrier, not shown, which are exposed. This is because the control voltage is very low compared with the main circuit voltage. Though a cover is applied over the parts which would be subject to arcing, the ionized air can easily enter. When the potential difference becomes large between the cover and the line breaker box 41, the cover's insulation is broken, so that the arc is grounded to the exposed parts.

The control power lines connected to the terminal are bundled together with other control lines and connected to the control equipment box. Such being the situation, when the arc current flows, a large induced current flows not merely in the equipment connected with the control power line but also in the other control lines, resulting in the destruction of the devices connected to these lines, such as the master controller and the inverter control device.

Incidentally, the insulation of the power lines can be reinforced so as to prevent these lines from being contacted by a high voltage of the arc when the arc flows to the box. However, it is difficult to reinforce the insulation of the exposed parts.

Embodiments for solving this problem will be described with reference to FIGS. 17, 18, and 19.

Figure 16:
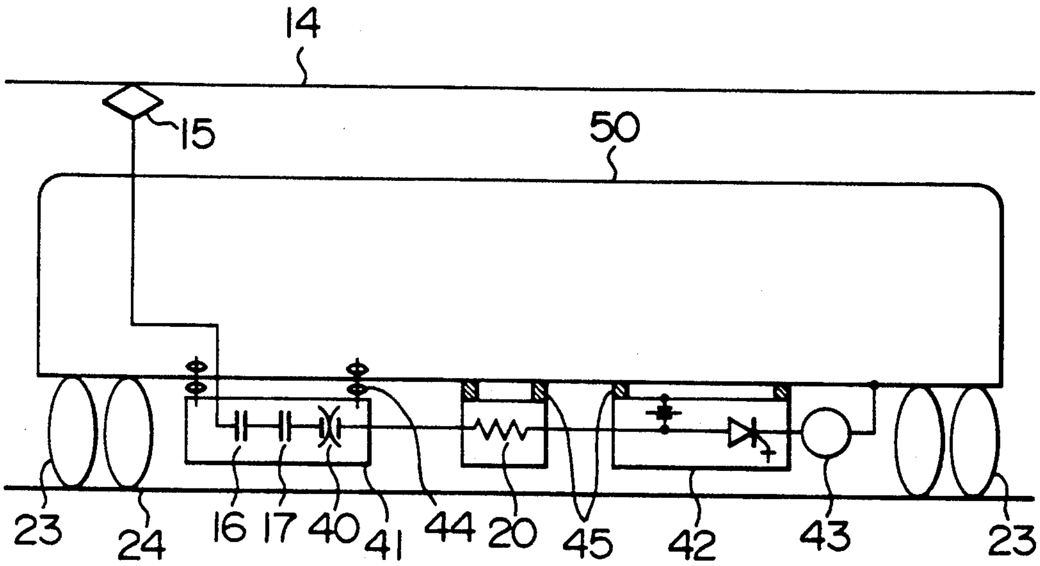
FIG. 16 is a diagram showing a conventional air circuit breaker mounted in electric rolling stock.
Figure 17:
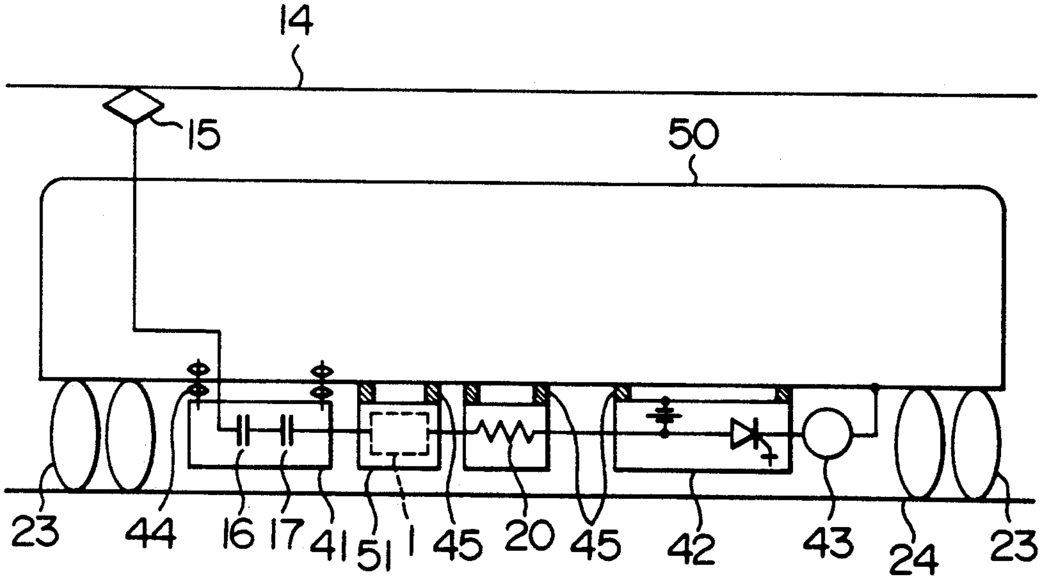
FIGS. 17 to 19 are diagrams showing the DC high-speed vacuum circuit breaker mounted in electric rolling stock.

In FIG. 17, the circuit configuration different from FIG. 16 is that while the line breakers 16, 17 are contained in the line breaker box 41, a circuit breaker box is added to contain the DC high-speed vacuum circuit breaker 1.

The circuit breaker box 51 for the DC high-speed vacuum circuit breaker 1 is directly attached to the car body 50 with fixtures 45. This is because in principle, the DC high-speed vacuum circuit breaker does not give off an arc and it is not necessary to separate it from the car body 50. In this case, the line breakers 16, 17 should preferably be made in double insulation construction, but the circuit box 51 need not.

According to this embodiment, there is no arcing to the circuit breaker box 51, so that it is not necessary to reinforce the insulation of the various control lines.

Figure 18:
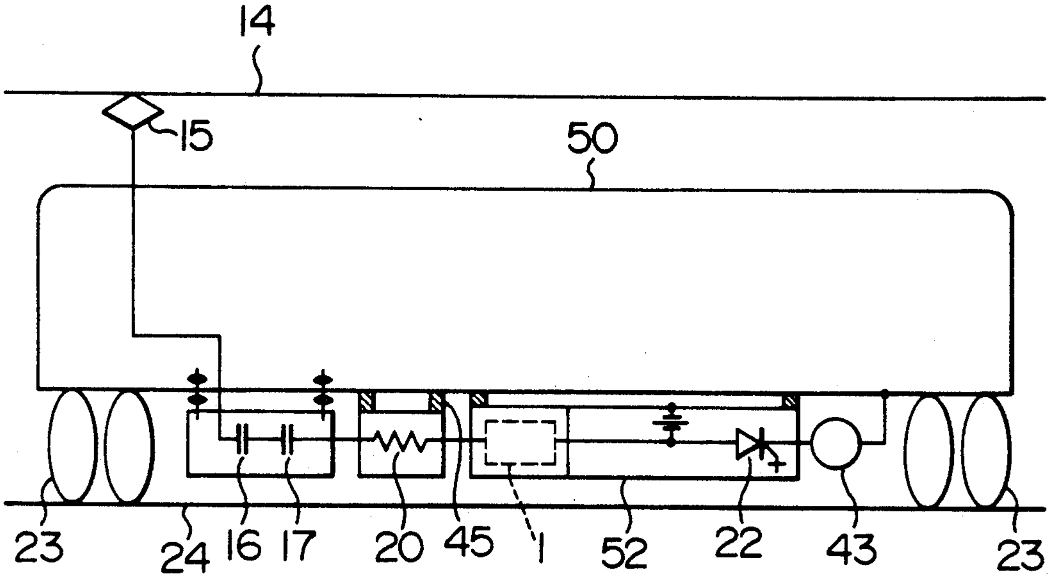

Referring to FIG. 18, still another embodiment will be described.

As described earlier, an external Trip command to the DC high-speed vacuum circuit breaker, or the like, is given by motor control devices, such as an inverter controller. Referring to FIG. 18, the DC high-speed vacuum circuit breaker 1 is accommodated in the inverter control device box 22 and forms an integral body with the box 22. In this case, the wire length of the Trip-command line from the inverter control device is short, so that the interfacing can be done easily. According to this embodiment, there is very little possiblity that the controller of the DC high-speed vacuum circuit breaker 1 malfunctions due to inductive interference.

Under the above arrangement, however, the filter reactor 20 is not protected completely, which is one of the objects to be protected on that side of the DC high-speed vacuum circuit breaker 1 closer to the overhead wire 4. This is because the filter reactor 20 is located closer to the power source than the DC high-speed vacuum circuit breaker 1.

There has been no ground fault of the reactor at all. However, it is necessary to protect the reactor against emergency, which hardly occurs.

Figure 19:
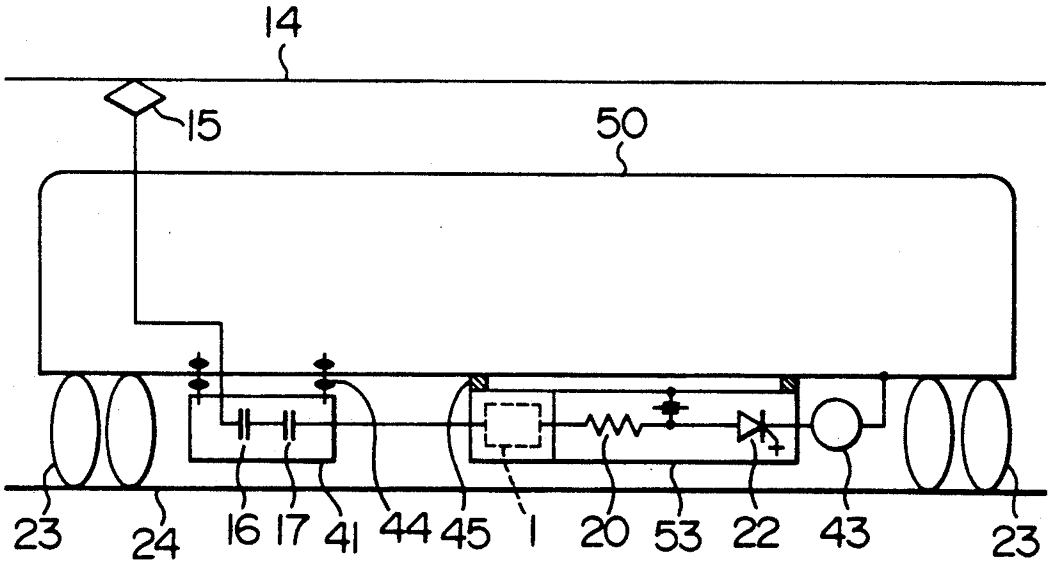

An embodiment which has solved this problem is shown in FIG. 19.

The filter reactor 20 is located on the load side of the DC high-speed vacuum circuit breaker 1, and accommodated integrally in the control box 53 including the inverter control device.

By this construction, not only the external appearance is made neat, but also the protected range is increased.

I claim:

1. A DC vacuum circuit breaker for mounting on an electric motor vehicle, said circuit breaker comprising:
   - a vacuum interrupter for inclusion in a circuit in which direct current flows so that a voltage is applied thereto, to cut off the direct current upon detection of a current fault;
   - resistance means connected in parallel with said vacuum interrupter for consuming energy stored in the inductance of the circuit in which direct current flows;
   - a saturable reactor connected in series with the parallel combination of said vacuum interrupter and said resistance means;
   - a series combination of a capacitor and switching means, said series combination connected in parallel with the series combination of said vacuum interrupter and said saturable reactor; and
   - means for charging said capacitor with a voltage opposite the voltage applied to said vacuum interrupter;
   - said vacuum interrupter, said saturable reactor, said capacitor and said switching means forming a closed circuit responsive to current flow of at least a predetermined value to have an oscillation frequency of at least 2 KHz, with an oscillation current amplitude of at least 5000 A and a closed circuit inductance of at least 1 $\mu$H.

2. A DC vacuum circuit breaker according to claim 1, wherein said resistance means is a nonlinear resistor.

3. A DC vacuum circuit breaker according to claim 1, wherein said resistance means is a linear resistor.

4. A DC vacuum circuit breaker according to claim 1, wherein said resistance means comprises a parallel combination of a nonlinear resistor and a linear resistor.

5. A DC vacuum circuit breaker as claimed in claim 1, wherein said vacuum interrupter, said capacitor, and said switching means comprise a circuit breaker unit.

6. A DC vacuum circuit breaker comprising:

a vacuum interrupter for inclusion in a circuit in which direct current flows so that a voltage is applied thereto, to cut off the direct current upon detection of a circuit fault;

a series combination of a capacitor and switching means, said series combination connected in parallel with said vacuum interrupter;

means for charging said capacitor with a voltage opposite the voltage applied to said vacuum interrupter; and resistance means and a capacitive element connected in parallel with each other and in parallel with said vacuum interrupter, for consuming the energy stored in the circuit in which direct current flows, with the length of a closed circuit including said vacuum interrupter and said capacitive element being shorter than the length of a closed circuit including said vacuum interrupter, said capacitor, and said switching means, the closed circuit including said vacuum interrupter, said capacitor, and said switching means being responsive to current flow of at least a predetermined value to have an oscillation frequency of at least 2 kHz, with an oscillation current amplitude of at least 5000 A and a closed circuit inductance of at least 1 $\mu$H.

7. A DC vacuum circuit breaker according to claim 6, wherein said resistance means is a nonlinear resistor.

8. A DC vacuum circuit breaker according to claim 6, wherein said resistance means is a linear resistor.

9. A DC vacuum circuit breaker according to claim 6, wherein said resistance means comprises a parallel combination of a nonlinear resistor and a linear resistor.

10. A DC vacuum circuit breaker according to claim 6, wherein said capacitive element has a capacitance larger than the capacitance of said vacuum interrupter when said vacuum interrupter is opened to cut off the direct current.

11. A DC vacuum circuit breaker according to claim 10, wherein said capacitive element is a capacitor.

12. A DC vacuum circuit breaker according to claim 6, wherein said capacitive element is a capacitor.

13. A DC vacuum circuit breaker comprising:

a vacuum interrupter for inclusion in a circuit in which direct current flows so that a voltage is applied thereto, to cut off the direct current upon detection of a circuit fault;

a series combination of a capacitor and switching means, said series combination connected in parallel with said vacuum interrupter;

means for charging said capacitor with a voltage opposite the voltage applied to said vacuum interrupter; and resistance means connected in parallel with said vacuum interrupter, for consuming the energy stored in the circuit in which direct current flows, with the length of a closed circuit including said vacuum interrupter and said resistance means being shorter than the length of a closed circuit including said vacuum interrupter, said capacitor, and said switching means, the closed circuit including said vacuum interrupter, said capacitor, and said switching means being responsive to current flow of at least a predetermined value to have an oscillation frequency of at least 2 KHz, with an oscillation current amplitude of at least 5000 A and a closed circuit inductance of at least 1 $\mu$H.

14. A DC vacuum circuit breaker according to claim 13, wherein said resistance means is a nonlinear resistor.

15. A DC vacuum circuit breaker according to claim 13, wherein said resistance means is a linear resistor.

16. A DC vacuum circuit breaker according to claim 13, wherein said resistance means comprises a parallel combination of a nonlinear resistor and a linear resistor.

17. In combination:

an electric motor vehicle having a main electric motor;

circuit means for supplying a direct current to said main electric motor;

main motor control means for controlling operation of said main electric motor;

a vacuum interrupter in said circuit means so that a voltage is applied to said vacuum interrupter, for cutting off direct current in said circuit means;

a series combination of a capacitor and switching means, said series combination connected in parallel with said vacuum interrupter;

means for charging said capacitor with a voltage opposite the voltage applied to said vacuum interrupter; and resistance means connected in parallel with said vacuum interrupter, for consuming energy stored in said circuit means, said vacuum interrupter, said capacitor, and said switching means being responsive to current flow of at least a predetermined value to have an oscillation frequency of at least 2 KHz, with an oscillation current amplitude of at least 5000 A and a closed circuit inductance of at least 1 $\mu$H.

18. The combination according to claim 17, wherein said resistance means is a nonlinear resistor.

19. The combination according to claim 17, wherein said resistance means is a linear resistor.

20. The combination according to claim 17, wherein said resistance means comprises a parallel combination of a nonlinear resistor and a linear resistor.

21. In combination:

an electric motor vehicle having a main electric motor;

circuit means for supplying a direct current to said main electric motor, main motor control means for controlling operation of said main electric motor;

a vacuum interrupter in said circuit means so that a voltage is applied to said vacuum interrupter, for cutting off direct current in said circuit means;

a series combination of a capacitor and switching means, said series combination connected in parallel with said vacuum interrupter;

means for charging said capacitor with a voltage opposite the voltage applied to said vacuum interrupter;

resistance means connected in parallel with said vacuum interrupter, for consuming the energy stored in said circuit means; and a capacitive element connected in parallel with said vacuum interrupter;

said vacuum interrupter, said capacitor, and said switching means being responsive to current flow of at least a predetermined value to have an oscillation frequency of at least 2 KHz, with an oscillation current amplitude of at least 5000 A and a closed circuit inductance of at least 1 μH.

22. The combination according to claim 21, wherein said resistance means is a nonlinear resistor.

23. The combination according to claim 21, wherein said resistance means is a linear resistor.

24. The combination according to claim 21, wherein said resistance means comprises a parallel combination of a nonlinear resistor and a linear resistor.

25. The combination according to claim 21, wherein said capacitive element has a capacitance larger than the capacitance of said vacuum interrupter when said vacuum interrupter is opened to cut off direct current.

26. The combination according to claim 25, wherein said capacitive element is a capacitor.

27. The combination according to claim 21, wherein said capacitive element is a capacitor.

28. In combination:

an electric motor vehicle having a main electric motor;

circuit means for supplying a direct current to said main electric motor;

main motor control means for controlling operation of said main electric motor;

a vacuum interrupter in said circuit means so that a voltage is applied to said vacuum interrupter, for cutting off direct current in said circuit means;

a series combination of a capacitor and switching means, said series combination connected in parallel with said vacuum interrupter;

means for charging said capacitor with a voltage opposite the voltage applied to said vacuum interrupter;

resistance means connected in parallel with said vacuum interrupter, for consuming energy stored in said circuit means, with the length of a closed circuit including said vacuum interrupter and said resistance means being shorter than the length of a closed circuit including said vacuum interrupter, said capacitor, and said switching means, said vacuum interrupter, said capacitor and said switching means forming a closed circuit responsive to current flow of at least a predetermined valve to have an oscillation frequency of at least 2 KHz, with an oscillation current amplitude of at least 5000 A and a closed circuit inductance of at least 1 μH.

29. The combination according to claim 28, wherein said resistance means is a nonlinear resistor.

30. The combination according to claim 28, wherein said resistance means is a linear resistor.

31. The combination according to claim 28, wherein said resistance means comprises a parallel combination of a nonlinear resistor and a linear resistor.

32. In combination:

an electric motor vehicle having a main electric motor;

circuit means for supplying a direct current to said main electric motor;

main motor control means for controlling operation of said main electric motor;

a vacuum interrupter in said circuit means so that a voltage is applied thereto, for cutting off direct current in said circuit means;

a series combination of a capacitor and switching means, said series combination connected in parallel with said vacuum interrupter;

means for charging said capacitor with a voltage opposite the voltage applied to said vacuum interrupter; and resistance means connected in parallel with said vacuum interrupter to form with said vacuum interrupter and said series combination an oscillator circuit having an oscillation frequency of at least 2 KHz and an inductance of at least 1 μH, with a commutating current of at least 5000 A, for consuming energy stored in said circuit means.

33. A DC vacuum circuit breaker for mounting on an electric motor vehicle, said circuit breaker comprising:

a vacuum interrupter for inclusion in a circuit in which direct current flows so that a voltage is applied thereto, to cut off the direct current upon detection of a current fault;

resistance means connected in parallel with said vacuum interrupter for consuming energy stored in the inductance of the circuit in which direct current flows;

a saturable reactor connected in series with the parallel combination of said vacuum interrupter and said resistance means;

a series combination of a capacitor and switching means, said series combination connected in parallel with the series combination of said vacuum interrupter and said saturable reactor; and means for charging said capacitor with a voltage opposite the voltage applied to said vacuum interrupter;

said vacuum interrupter, said saturable reactor, said capacitor and said switching means forming a closed circuit responsive to current flow of at least a predetermined value to having an oscillation frequency of at least 2 KHz, with an oscillation current amplitude of at least 5000 A and a closed circuit inductance of at least 1 μH;

a box having said vacuum interrupter, said series combination, said charging means, and said resistance means accommodated therein, said box being sized for mounting on an electric motor vehicle.

34. A DC vacuum circuit breaker according to claim 33, wherein said resistance means is a nonlinear resistor.

35. A DC vacuum circuit breaker according to claim 33, wherein said resistance means is a linear resistor.

36. A DC vacuum circuit breaker according to claim 33, wherein said resistance means comprises a parallel combination of a nonlinear resistor and a linear resistor.

37. In combination:

an electric motor vehicle having a main electric motor;

means for applying a direct current to said main electric motor;

main motor control means for controlling said main electric motor;

a line breaker box connected to said electric motor vehicle and containing a line breaker for cutting off the direct current; and a vacuum circuit breaker box connected to said motor vehicle and containing a DC vacuum circuit breaker, said vacuum circuit breaker including:

a vacuum interrupter in the circuit of said main electric motor so that a voltage is applied thereto, for cutting off the direct current to said main electric motor upon detection of a current fault;

resistance means connected in parallel with said vacuum interrupter for consuming energy stored in the inductance of the circuit of said main electric motor;

a saturable reactor connected in series with the parallel combination of said vacuum interrupter and said resistance means;

a series combination of a capacitor and switching means, said series combination connected in parallel with the series combination of said vacuum interrupter and said saturable reactor; and means for charging said capacitor with a voltage opposite the voltage applied to said vacuum interrupter;

said vacuum interrupter, said saturable reactor, said capacitor and said switching means forming a closed circuit responsive to current flow of at least a predetermined value to have an oscillation frequency of at least 2 KHz, with an oscillation current amplitude of at least 5000 A and a closed circuit inductance of at least 1 $\mu$H.

* * * * *